(12) United States Patent
Agarwal et al.

(10) Patent No.: US 8,554,625 B2
(45) Date of Patent: Oct. 8, 2013

(54) MOBILE ADVERTISING AND CONTENT CACHING MECHANISM FOR MOBILE DEVICES AND METHOD FOR USE THEREOF

(75) Inventors: Garima Agarwal, Santa Clara, CA (US); Ciaran T Rochford, Sunnyvale, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 778 days.

(21) Appl. No.: 11/842,355

(22) Filed: Aug. 21, 2007

(65) Prior Publication Data

US 2008/0140529 A1    Jun. 12, 2008

Related U.S. Application Data

(60) Provisional application No. 60/873,682, filed on Dec. 8, 2006.

(51) Int. Cl.
*G06Q 10/00* (2012.01)

(52) U.S. Cl.
USPC .................... 705/14.59; 705/14.64; 705/14.5

(58) Field of Classification Search
USPC ............................. 705/14, 14.5, 14.59, 14.64
See application file for complete search history.

(56) References Cited

U.S. PATENT DOCUMENTS

| | | | |
|---|---|---|---|
| 2002/0077900 A1* | 6/2002 | Thompson et al. | 705/14 |
| 2002/0108121 A1* | 8/2002 | Alao et al. | 725/110 |
| 2002/0178232 A1* | 11/2002 | Ferguson | 709/217 |
| 2003/0033380 A1* | 2/2003 | Kuriyama | 709/218 |
| 2004/0054650 A1* | 3/2004 | Chun | 707/1 |
| 2005/0144162 A1* | 6/2005 | Liang | 707/3 |
| 2005/0215238 A1* | 9/2005 | Macaluso | 455/414.1 |
| 2007/0088852 A1* | 4/2007 | Levkovitz | 709/246 |
| 2007/0168389 A1* | 7/2007 | Lipscomb | 707/104.1 |

OTHER PUBLICATIONS

Noguchi, Yuki. "MSNBS Brings Free News Clips to Cellphone Audience; [FINAL Edition]". The Washington Post. Washington, D.C.: Apr. 6, 2006. p. D.04.*
Careless, James. "Web access through any telephone anywhere; [Toronto Edition 1]". National Post. Don Mills, Ont.: Jun 19, 2000. p. E.5.*

* cited by examiner

Primary Examiner — Gabrielle McCormick

(57) ABSTRACT

The present disclosure relates generally to systems and methods for a mobile advertising and content caching mechanism for mobile devices and a method for using such a mechanism. In one example, the method includes monitoring a mobile device for activity indicating user interest in an advertising area. The method detects an application launch request corresponding to the monitored activity and intercepts the application launch request. The method provides multimedia advertising content to an output component of the mobile device, and launches the application corresponding to the application launch request after the multimedia advertising content has finished playing on the output component.

20 Claims, 5 Drawing Sheets

MOBILE ADVERTISING AND CONTENT CACHING MECHANISM FOR MOBILE DEVICES AND METHOD FOR USE THEREOF

CLAIM OF PRIORITY AND CROSS REFERENCE TO RELATED APPLICATIONS

This application claims priority to U.S. Provisional Patent Application Ser. No. 60/873,682, filed on Dec. 8, 2006, and entitled "MOBILE ADVERTISING AND CONTENT CACHING MECHANISM FOR MOBILE DEVICES AND METHOD FOR USE THEREOF", which is incorporated by reference herein in its entirety.

This application is related to U.S. patent application Ser. No. 7,761,408, filed on Aug. 23, 2007, issued on Jul. 20, 2010, and entitled "KEYWORD GENERATION AND MANAGEMENT FOR SELECTION OF CUSTOMIZED CONTENT FOR A USER DEVICE", and U.S. patent application Ser. No. 11/769,899, filed on Jun. 28, 2007, and entitled "SYSTEM AND METHOD FOR CONTROLLING THE PRESENTATION OF DYNAMIC INFORMATION TO A MOBILE DEVICE", both of which are incorporated by reference herein in their entirety.

BACKGROUND

Advertisers are continually searching for more ways to provide advertising content to potential or current customers. As mobile devices such as mobile telephones and personal digital assistants become more ubiquitous, advertisers often desire to communicate advertising content through such devices. However, current technologies lack efficient ways to accomplish this, and so an improved system and method for controlling mobile device advertisements are needed.

SUMMARY

In one embodiment, a method comprises monitoring a mobile device for activity indicating user interest in an advertising area, detecting an application launch request corresponding to the monitored activity, intercepting the application launch request, providing multimedia advertising content to an output component of the mobile device, and launching an application corresponding to the application launch request after the multimedia advertising content has finished playing on the output component.

In another embodiment, a method comprises monitoring a mobile device for an application launch request, downloading at least a portion of a multimedia file while an application launched in response to the application launch request is being executed, wherein the downloading does not interfere with the execution of the application, ending the downloading when the application is finished executing, determining whether the multimedia file has been completely downloaded after the application is finished executing, and storing the multimedia file on the mobile device, wherein only a downloaded portion of the multimedia file is stored if the multimedia file was not completely downloaded.

In yet another embodiment, an advertising engine for use with a mobile device comprises a main engine stored on the mobile device, an ad server, an assistant component, and a data gathering component. The ad server is coupled to the main engine and stored on the mobile device, wherein the ad server is configured to return a multimedia file to the main engine in response to a request from the main engine. The assistant component is coupled to the main engine and stored on the mobile device, wherein the assistant component is configured to provide a plurality of configuration options to a user, store selections made by the user with respect to the configuration options, and pass the selections to the main engine. The data gathering component is coupled to the main engine and stored on the mobile device, wherein the data gathering component is configured to monitor user activity in order to select the multimedia file from a plurality of multimedia files.

In still another embodiment, a mobile device comprises a wireless network interface, a processor coupled to the wireless network interface, and a memory coupled to the processor and configured to store a plurality of instructions for use by the processor. The instructions include instructions for monitoring a mobile device for activity indicating user interest in an advertising area, instructions for detecting an application launch request corresponding to the monitored activity, instructions for intercepting the application launch request, instructions for providing advertising content to an output component of the mobile device, and instructions for launching the application corresponding to the application launch request after the advertising content has finished playing on the output component.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
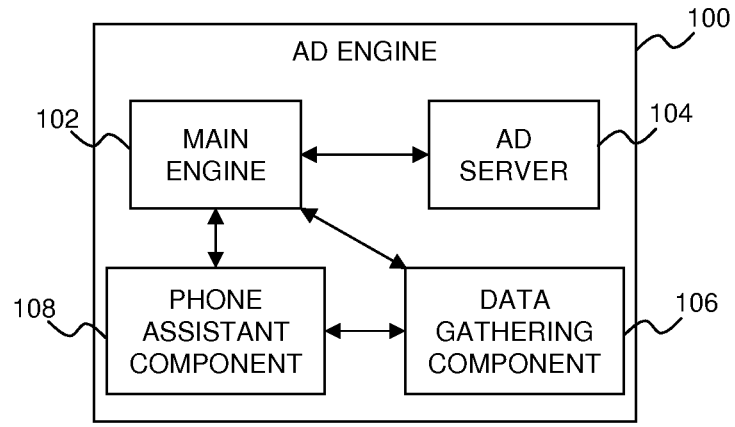
FIG. 1 is a block diagram of one embodiment of an ad engine.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Mobile devices, such as cellphones, may be considered the "third screen" used by consumers, with the first two screens being the television and the laptop (or computers in general). The extensive growth of technology, emerging consumer demand for multimedia content, and the fact that mobile devices provide such a personalized medium to connect with consumers have introduced a mobile advertising market. However, among various challenges in communicating information effectively in a world of large panel flat screen high definition televisions and similar products, one challenge in mobile advertising is to maintain a certain level of user experience on the small screen provided by a mobile device. Generally, it is desirable to provide advertisements using a model that minimizes intrusion into a consumer's experience with a mobile device, and that provides a relatively enjoyable experience in a short amount of time. It may also be desirable to refresh advertising content without making the consumer wait for any needed downloads to complete.

Referring to FIG. 1, in one embodiment, an advertising engine (ad engine) 100 is illustrated with a main engine 102, an ad server component 104, a data gathering component 106, and a phone assistant component 108. It is understood that the components may be arranged differently and may be combined or further divided. Furthermore, it is understood that functionality provided by one or more of the main engine 102, ad server component 104, data gathering component 106, and phone assistant component 108 may be distributed in some embodiments. For example, the entire functionality provided by a component of the ad engine 100 may reside on a mobile device, or a portion of the functionality may reside on the mobile device and a portion of the functionality may reside elsewhere, such as on a server coupled to a wireless network with which the mobile device is communicating.

The ad engine 100 may be used to provide advertising to mobile devices while minimizing the impact of a user's experience with the mobile device. For example, the ad engine 100 may provide an advertising solution that can be associated with high-value applications installed on a mobile device. In the present example, the main engine 102 may provide ad-download, ad-selection, and ad-play functionality along with context-based searches. The ad server component 104 may provide advertising clips (e.g., video, audio, and/or text) to the main engine 102. The data gathering component 106 may enable the use of targeted advertising. For example, through the use of different applications like voice recognition or a Short Message Service (SMS) client, specific keywords used by a user can be used to identify and play relevant advertisements for the user, thereby increasing the possibility of an ad hit (i.e., the data gathering component 106 may gather data entered by the user in SMS messages and store the information for later context sensitive ad searches). One embodiment of the data described in greater detail in previously incorporated U.S. patent application Ser. No. 7,761,408. The phone assistant component 108, which may be integrated with the data gathering component 106, may enable a user to specify preferences for context-sensitive searches. In some embodiments, if the user chooses not to use the phone assistant component 108, the data gathering component 106 may be de-activated.

It is understood that many different enhancements may be added to or used in conjunction with the ad engine 100 and the ad engine may provide many different benefits and customization options. For example, the ad engine 100 may use global positioning satellite (GPS) information to provide location sensitive advertisements, which may or may not require user approval. In another example, downloaded advertisements may act as coupons that can be saved for later use. The ad engine 100 may be tied into the home screen of the handset. Handset costs may be subsidized based on revenue generated by the ad engine 100. Downloaded advertising campaigns may be supported for an additional advertising fee. Mobiles devices may be allocated to a single advertiser or group of advertisers. In still other embodiments, a sponsor may pay for the cost of the call to subscribers (e.g., air time and rewards). Accordingly, the ad engine 100 may be used to provide a customizable advertising experience.

Figure 2:
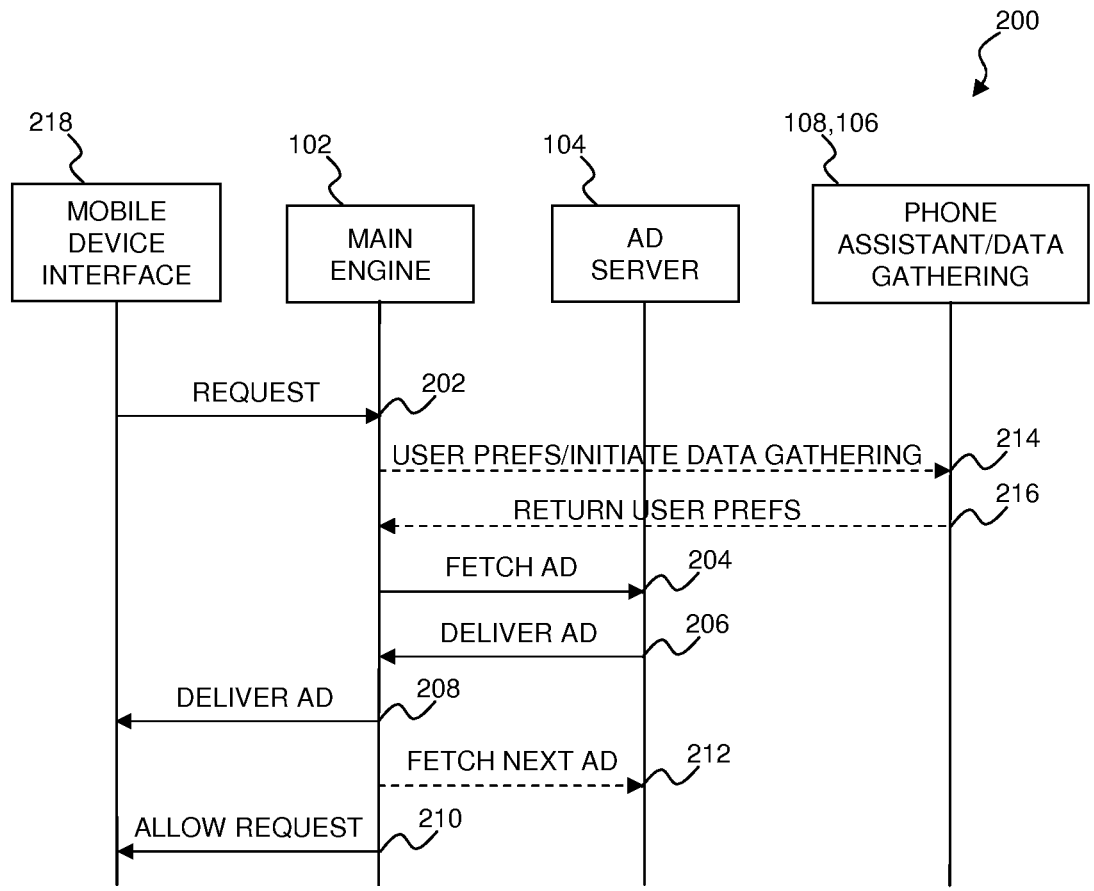
FIG. 2 is a sequence diagram illustrating one embodiment of a message flow between components of the ad engine of FIG. 1 and a mobile device interface.

With additional reference to FIG. 2, a sequence diagram 200 illustrates one embodiment of a message flow between a mobile device interface 218 and the ad engine 100 of FIG. 1. In the present example, for purposes of clarity, the mobile device interface 218 represents a boundary between the mobile device's ordinary functionality and the functionality provided by the ad engine 100. However, it is understood that a clear boundary may not exist in some embodiments depending on such factors as the actual implementation of the ad engine 100 and/or the particular configuration of the mobile device.

In step 202, the mobile device produces a request to launch an application, such as a video client configured to access and display a multimedia file. For example, a user of the mobile device may launch a premium application (e.g., a video client) that is being subsidized because the user has agreed to watch advertisements in return. When the user launches the client, the request is intercepted. In one example, software in the mobile device (e.g., separate from the ad engine 100) captures this request and launches the ad engine 100 instead. In another example, the main engine 102 of the ad engine 100 intercepts the request and interacts with other components of the ad engine 100. Accordingly, it is understood that the interception of the request may be accomplished in various ways.

In step 204, the main engine 104 fetches an advertisement (e.g., a multimedia file) by sending a request to the ad server component 104. The ad server component 104 responds by delivering an advertisement to the main engine 102 in step 206. The advertisement may be selected based on various criteria, as will be discussed below. In step 208, the main engine 102 delivers the advertisement to the mobile device interface 218 for display to the user. After the advertisement is played, the main engine 102 may allow completion of the original request of step 202. This may be accomplished, for example, by forwarding the request back to the mobile device interface 218 or by removing a delay or hold placed on the request by the main engine 102.

In some embodiments, while the advertisement is playing, the main engine 102 may request another advertisement from the ad server component 104 in step 212. The next advertisement may then be downloaded to the mobile device while the current advertisement is playing. If the current advertisement ends before the download of the next advertisement is finished, the download may be stopped for later completion, as will be described below in greater detail.

In still other embodiments, if the user of the mobile device has activated (or not deactivated) the phone assistant component 108, the main engine 102 may communicate with the phone assistant component 108 and/or data gathering component 106 prior to fetching the advertisement in step 204. For example, the main engine 102 may send a request for user preferences to the phone assistant component 108 and/or activate the data gathering component 106 in step 214. In step 216, any applicable user preferences (e.g., that may be used to target the advertisement fetched in step 204) may be returned to the main engine 102 and/or data gathering functionality may be activated. It is understood that other communication channels may be used. For example, the phone assistant component 108 may interact directly with the ad server 104 to identify targeted advertisements for the user.

Figure 3:
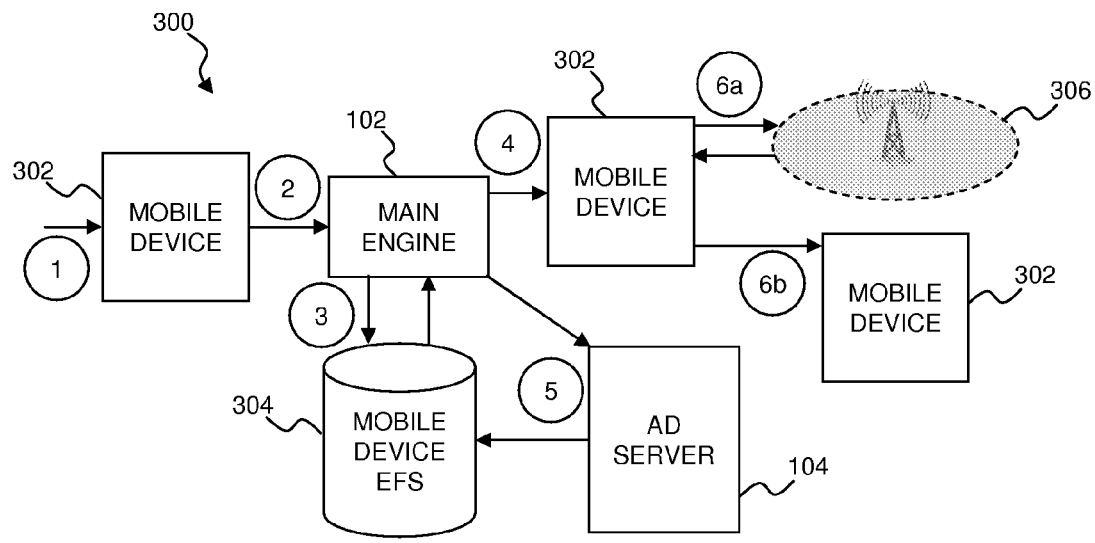
FIG. 3 is a block diagram illustrating one embodiment of the ad engine of FIG. 1 in operation.

Referring to FIG. 3, one embodiment of the ad engine 100 of FIG. 1 in operation is illustrated. In the present example, when a user of a mobile device 302 launches a value based application (step 1), such as a video client that is configured to download and play a video from a website, the request is intercepted and the ad engine 100 is launched (step 2). The ad engine 100 finds an appropriate advertisement based on the user preferences (if any) and/or advertisements available (step 3) and loads it into an ad cache from the mobile device's electronic file system (EFS) 304. The ad engine 100 begins playing the advertisement from the ad cache (step 4) and, while the advertisement is being played, the ad engine 100 may download another advertisement for future use (step 5) from the ad server 104. If the download completes while the video is still playing, the ad engine 100 may start downloading another advertisement (repeating step 5).

When the advertisement being played reaches an end, the advertisement being downloaded is paused and the video client is launched for the video originally requested by the user (step 6b). Accordingly, the download does not interfere with the flow of execution. The partially downloaded advertisement may stored as-is in the mobile device 302 (e.g., in the mobile device's EFS 304). The next time the user launches another value added application, the ad engine 100 starts and launches another ad. At the same time, it may resume the download of the partially downloaded ad. The user may request additional information based on the advertisement (step 6a), in which case the ad engine 100 may provide the user with the information or may connect the user to an outside information source via, for example, a network 306.

In the present example, the ad engine 100 may provide features related to various areas, such as flexible advertising, context sensitive advertisements, launch statistic tracking, ad-forwarding, user privacy, restricted advertisement replay, and returns.

Flexible advertising may be handled by the ad engine's provision of both online and offline ad-launch capabilities. For example, some high-value advertisements may be downloaded to the mobile device during installation while other (lower value) advertisements are downloaded over-the-air. These downloads can take place in the background while the existing advertisements are playing. As soon as the played advertisement reaches an end, the download is paused. The download may then be restarted from that point onwards during the next advertisement launch. This means the mobile device user does not have to wait for an advertisement to be downloaded to their phone, which may help maintain a desired user experience.

Context sensitive advertisements provide an advertising solution that lets mobile operators and media companies intelligently manage the rotation and insertion of advertisements. For example, advertisements can be downloaded based on applications and search contexts corresponding to actions being performed on the mobile device by the user. This may be achieved through the phone assistant component (108 of FIG. 1). The phone assistant component 108 may be an application configured to obtain context-sensitive data from the mobile device user and store the data for use by the ad engine 100.

Launch statistic tracking may be provided as the ad engine 100 tracks the launch statistics of advertisements with details such as advertisement name, file name, and time at which it was launched. Such tracking may also track which advertisements are launched on the basis of context-sensitive searches. Such logging may aid in revenue calculations and may also aid in associating advertisements with keywords used in user searches.

Ad-forwarding may be supported by the ad engine 100 as the ad engine forwards an advertisement to another ad engine capable mobile device. Such ad forwarding may translate into higher returns for advertising companies.

User privacy may be aided by the phone assistant component 108 of the ad engine 100, which allows the user to enable or disable context-sensitive searches, thereby maintaining user privacy. The user may have many different configurable options, such as clearing any existing cache data on the mobile device.

The ability to restrict advertisement replay, which defines how many times an advertisement gets played, may be used by the ad engine 100 to maintain a desired user experience and to provide room for newer advertisements. For example, advertisements may be deleted after they have been played a fixed number of times. The advertising company may be allowed to buy additional "lives" for the advertisements in some embodiments.

Returns may be used if the user finds an advertisement interesting. In such a case, the user may be given the option of replaying the advertisement or obtaining additional information about the advertisement by selecting an option such as a "More Info" option. The option may lead the user to a uniform resource locator (URL), a phone number, or other contact information that may be specified by the advertisers. In some examples, the user may also have the option of playing the next advertisement available.

Figure 4:
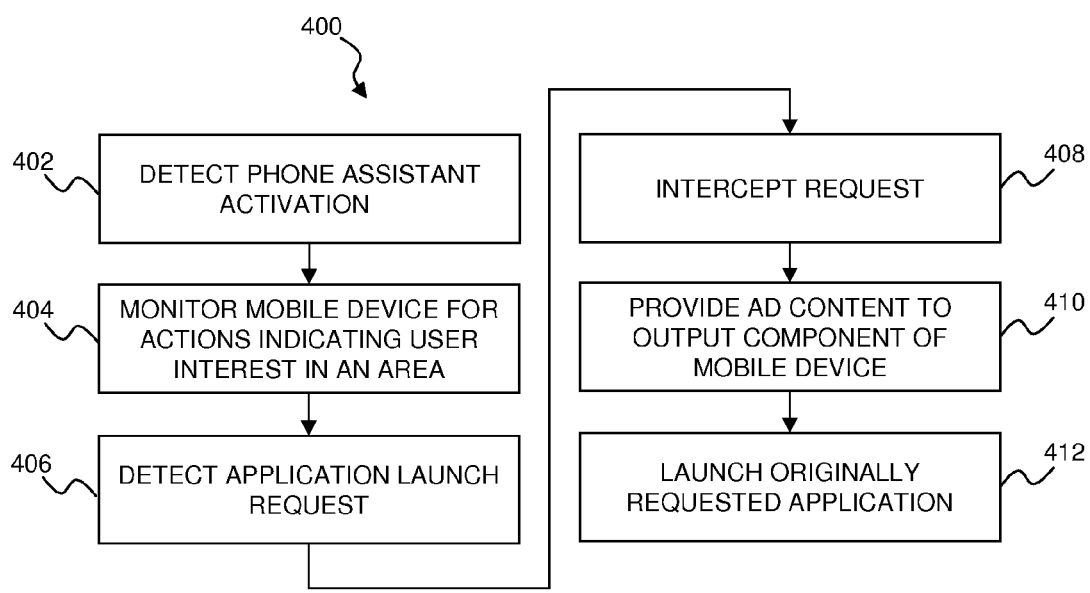
FIG. 4 is a flow chart illustrating one embodiment of a method for use by the ad engine of FIG. 1 or in conjunction with such an ad engine.

Referring to FIG. 4, in another embodiment, a method 400 illustrates one example of a process that may be used by or in conjunction with the ad engine 100 of FIG. 1. In step 402, activation of the phone assistant component 108 may be detected. As described previously, the phone assistant component 108 may be integrated with the data gathering component 106 and may enable a user to specify preferences for context-sensitive searches. In step 404, the ad engine 100 may monitor the mobile device for actions indicating user interest in an area. For example, the ad engine may monitor messages (e.g., SMS messages), user activation of multimedia clients, and similar activities. It is understood that the ad engine 100 may monitor the mobile device for any desired activity, and that the activities monitored may be regulated by the user preferences.

In step 406, the ad engine 100 or other software in the mobile device may detect the launch of an application or another defined activity for which the ad engine is configured to monitor. For example, the ad engine 100 may detect the launch of a multimedia client application. In step 408, the ad engine 100 intercepts the request. For example, the interception may involve storing the request in a buffer. It is understood that the interception prevents the request from reaching its destination until permitted by the ad engine 100. In step 410, the ad engine 100 provides advertising content to the user via one or more of the mobile device's output components (e.g., speaker and screen). In step 412, when the advertisement has finished playing, the ad engine 100 launches the originally requested application.

Figure 5:
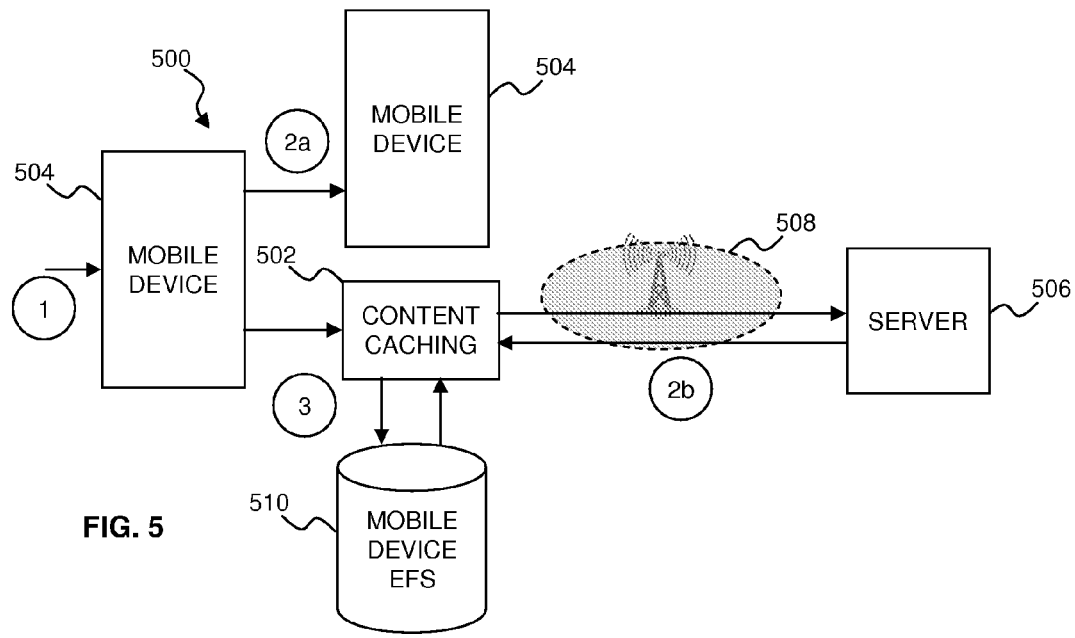
FIG. 5 is a block diagram illustrating one embodiment of a content caching component in operation.

Referring to FIG. 5, one embodiment of a content caching process is provided for dealing with the challenge of content size that faces mobile advertising models. Generally, content-based applications download content (e.g., multimedia advertisements) over the air. Depending on the format, resolution, and quality of the content, the file sizes may vary and may easily be several megabytes in size. Downloading such large files to a mobile device may take a longer amount of time than desired, which in turn may erode a user's experience if the user is waiting for the download to finish. Accordingly, it is desirable to provide a mechanism to handle such relatively large files.

Content-caching may provide an effective mechanism to allow for the download of advertising content files while eliminating or minimizing any negative impact on a user's experience. In this embodiment, the main components of content-caching include a database implementation and access to the mobile device EFS.

With respect to system implementation, the following example uses a content-based application that embeds some content videos in the application itself during compile time and, because of binary size restrictions or other issues, downloads the rest of the videos over the air and runs them sequentially.

With such a system, when the user launches the application for the first time, the embedded video (e.g., video-1) is played in the foreground and a download is started for the next video (e.g., video-2) in the background. Since video-1 is playing while video-2 is being downloaded, the user does not need to wait with a blank screen while the application downloads the first video to be played (e.g., video-1). The moment video-1 reaches an end or the user exits the application, the download is paused in the current state and the status is saved in the database. The database entry may include information such as that shown in Table 1, below.

TABLE 1

| File name | Complete File size (in bytes) | Downloaded File size (in bytes) | Partial download location |
|---|---|---|---|
| Video-2 | 5,000,000 | 3458900 | fs:///saved/download/location |

In the present example, the partially downloaded file for video-2 is stored in the mobile device's EFS.

When the user launches the next video or launches the application, another video is played in the foreground while the video-2 download is re-started from 3458900 bytes onwards. This time, if the download completes before the foreground video ends, then the downloaded video is saved and marked as complete so that the application will not try to download it again.

This mechanism allows for downloads of any size, with the size of the content restricted only by the size of the mobile device's file system. Along with freeing the mobile device's applications from size restrictions, this mechanism allows for a smooth download without any interference or obstruction in service to the user.

The content caching component 502 illustrated in FIG. 5 may be used with, for example, the ad engine 100 of FIG. 1. In the present example, a user of a mobile device 504 selects a content based application (step 1), such as the video client described previously. An embedded video (e.g., an advertisement) may be played for the user on the mobile device 504 (step 2a) while the content caching component 502 begins downloading one or more other content files to the mobile device 504 from a server 506 via a wireless network 508 (step 2b). If the download is not complete before the video finishes playing, the content caching component 502 caches the current state of the download for future use (step 3) in EFS 510 or another location. As described above, this may include such information as file name, size of the partially downloaded file, and storage location of the partially downloaded file.

Figure 6:
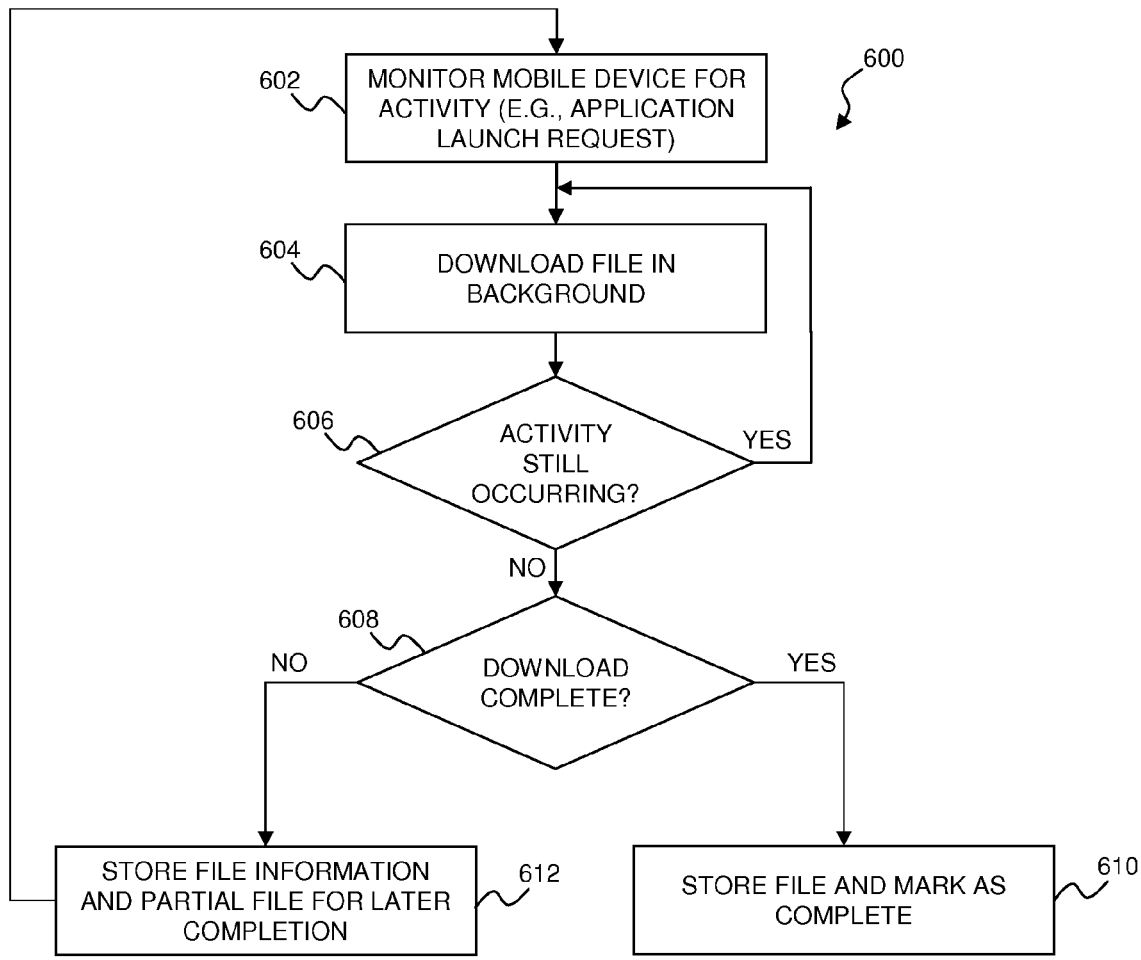
FIG. 6 is a flow chart illustrating one embodiment of a method for use by the content caching component of FIG. 5 or in conjunction with such a content caching component.

Referring to FIG. 6, a method 600 illustrates one embodiment of a content caching process that may be used with a mobile device. In the present example, the method 600 may be used with an ad engine, such as the ad engine 100 of FIG. 1, but it is understood that the method 600 may be used in a stand alone manner to download many different types of files in other embodiments.

In step 602, a content caching component (e.g., the content caching component 502 of FIG. 5) monitors a mobile device for a defined activity (e.g., a request to launch a particular client application). The content caching component 502 may monitor the mobile device directly for such activity or may receive such information from another source (e.g., the ad engine 100). In step 604, the content caching component 502 begins to download a file in the background while the application is executing (e.g., while the application is playing a video file). In the present example, the initial request (e.g., the activity detected in step 602) may not be interrupted as described with respect to the ad engine 100 of FIG. 1, or may be interrupted if the content caching component 502 is used in conjunction with the ad engine 100.

In step 606, a determination is made as to whether the application corresponding to the application launch request detected in step 602 is still executing. This determination may be made based on repeated monitoring, on the receipt of an interrupt, or other means. If the application is still executing, the method 600 continues to download the file (e.g., returns to step 604). If the application is still executing and the file download is complete, another download may be initiated or the download process may end.

In step 608, once the application stops being executed, a determination may be made as to whether the download is complete. If the download is complete, the method 600 may continue to step 610, where the file is stored and marked as complete to prevent further download attempts. If the download is not complete, the method 600 may continue to step 612, where it may store file information and the partial file. As described above, this may include such information as file name, size of the partially downloaded file, and storage location of the partially downloaded file. The method 600 may then return to step 602 to monitor for activity. Once activity is detected, the method 600 can proceed to step 604 again to continue downloading the partial file.

Figure 7:
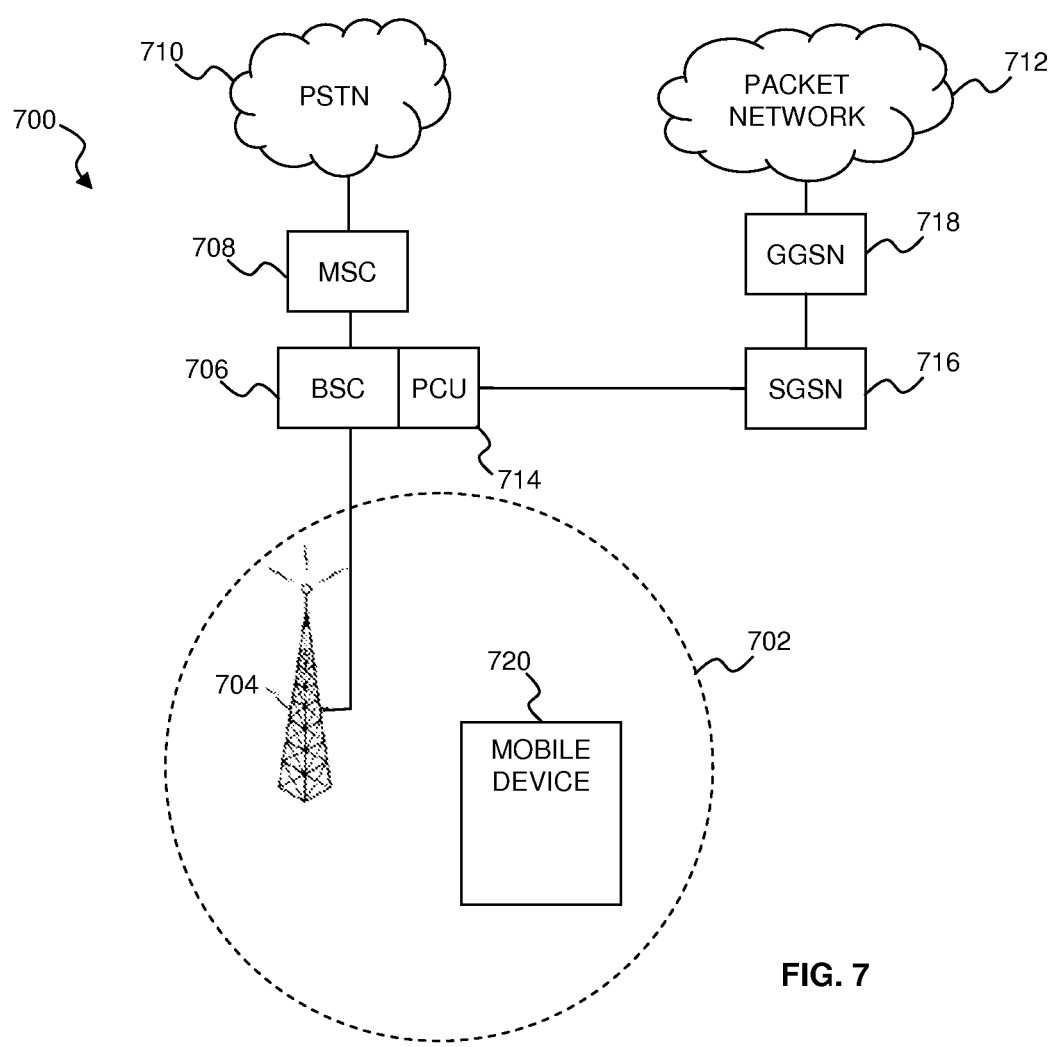
FIG. 7 is a block diagram of one embodiment of a wireless network within which various aspects of the present disclosure may be practiced.

Referring to FIG. 7, one embodiment of a portion of a wireless network 700 in which aspects of the disclosure may be practiced is illustrated. In the present example, the network 700 is based on Global System for Mobile communication (GSM) technology, but it is understood that the present disclosure may be implemented in any wireless network. For example, the present disclosure may be implemented in networks using Code Division Multiple Access (CDMA) technologies (including evolution data-only (EV-DO) architectures) based on Interim Standard 95 (IS-95), Interim Standard 2000 (IS-2000) and Universal Mobile Telecommunications System (UMTS). The network 400 may represent other technologies, including Orthogonal Frequency Division Multiplexing (OFDM). Furthermore, the network 400 may be a packet-based wireless network. Accordingly, it is understood that the methods of the present disclosure may be performed in networks based on different technologies and that the example of a GSM network is for purposes of illustration only.

The network 700 comprises a plurality of cells, such as cell 702. It is understood that the cell may represent any subdivision (e.g., a cell, sector, or other network segment) of a wireless network. In the present example, the network 700 may be connected to other wireless and/or wireline networks, such as Public Switched Telephone Network 710 and packet network 712 (which may be any combination of private and public networks based on any packet technology, such as the Internet Protocol (IP) and the Transport Control Protocol (TCP)). Cell 702 includes base transceiver station (BTS) 704 that is coupled to base station controller (BSC) 706. A mobile switching center (MSC) 708 may be used to connect the network 700 with other networks, such as PSTN 710. Although not shown, the BSC 706 may be coupled to multiple BTSes, and the MSC 708 may be coupled to other BSCs.

The BSC 706 may include or be coupled to a Packet Control Unit (PCU) 714 that may be configured to handle packet data for the BSC and to couple the GSM portion of the network 700 with a General Packet Radio Service (GPRS) portion for data packets. The terms "packet" and "packet data", as used in the present disclosure, may be interchangeable and may include any type of encapsulated data, including datagrams, frames, packets, and the like, and the encapsulated information may include voice, video, data, and/or other encapsulated information. The PCU 714 may be coupled to a Serving GPRS Support Node (SGSN) 716 that is coupled to the packet network 712 via a Gateway GPRS Support Node (GGSN) 718.

A mobile device 720 may communicate with the network 700 via the BTS 704 when positioned in the cell 702 (or in another cell associated with the network 700). In the present example, the mobile device 720 is a mobile telephone, but it is understood that the mobile device may be any device capable of wirelessly communicating with a network, and such devices may include personal digital assistants, personal computers (e.g., laptops), and/or pagers.

Although not shown, it is understood that some or all entities of the network 700 may include one or more processors, memories, and other components that enable the entities to receive, store, retrieve, process, and transmit instructions and data over wireless and/or wireline communication links. Furthermore, at least some functionality of an entity may be distributed and located elsewhere, either within a cell or outside of a cell. Repeaters (not shown) may be used to extend the range of the BTS 704.

Figure 8:
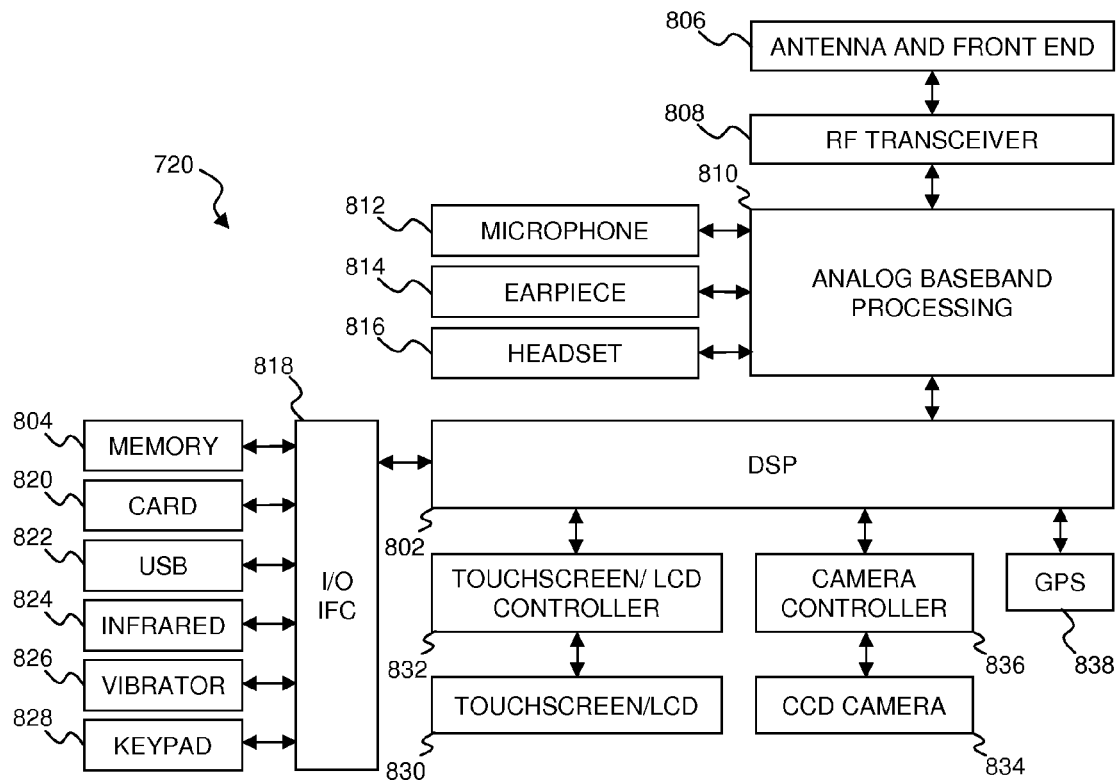
FIG. 8 is a block diagram of one embodiment of a mobile device that may be used within the wireless network of FIG. 7.

Referring to FIG. 8, a block diagram illustrates one embodiment of the mobile device 720 of FIG. 7 in greater detail. The mobile device 720 includes a digital signal processor (DSP) 802 and a memory 804. As shown, the mobile device 720 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, an infrared port 824, a vibrator 826, a keypad 828, a touch screen liquid crystal display (LCD) with a touch sensitive surface 830, a touch screen/LCD controller 832, a charge-coupled device (CCD) camera 834, a camera controller 836, and a global positioning system (GPS) sensor 838.

The DSP 802 or some other form of controller or central processing unit operates to control the various components of the mobile device 720 in accordance with embedded software or firmware stored in memory 804. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the mobile device 720 to send and receive information from a cellular network or some other available wireless communications network. The RF transceiver 808 provides frequency shifting, converting received RF signals to baseband and converting baseband transmit signals to RF. The analog baseband processing unit 810 may provide channel equalization and signal demodulation to extract information from received signals, may modulate information to create transmit signals, and may provide analog filtering for audio signals. To that end, the analog baseband processing unit 810 may have ports for connecting to the built-in microphone 812 and the earpiece speaker 814 that enable the mobile device 720 to be used as a cell phone. The analog baseband processing unit 810 may further include a port for connecting to a headset or other hands-free microphone and speaker configuration.

The DSP 802 may send and receive digital communications with a wireless network via the analog baseband processing unit 810. In some embodiments, these digital communications may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the infrared port 824. The USB interface 822 may enable the mobile device 720 to function as a peripheral device to exchange information with a personal computer or other computer system. The infrared port 824 and other optional ports such as a Bluetooth interface or an IEEE 802.11 compliant wireless interface may enable the mobile device 720 to communicate wirelessly with other nearby mobile devices and/or wireless base stations.

The input/output interface 818 may further connect the DSP 802 to the vibrator 826 that, when triggered, causes the mobile device 720 to vibrate. The vibrator 826 may serve as a mechanism for silently alerting the user to any of various events such as an incoming call, a new text message, and an appointment reminder.

The keypad 828 couples to the DSP 802 via the interface 818 to provide one mechanism for the user to make selections, enter information, and otherwise provide input to the mobile device 720. Another input mechanism may be the touch screen LCD 830, which may also display text and/or graphics to the user. The touch screen LCD controller 832 couples the DSP 802 to the touch screen LCD 830.

The CCD camera 834 enables the mobile device 720 to take digital pictures. The DSP 802 communicates with the CCD camera 834 via the camera controller 836. The GPS sensor 838 is coupled to the DSP 802 to decode global positioning system signals, thereby enabling the mobile device 720 to determine its position. Various other peripherals may also be included to provide additional functions, e.g., radio and television reception.

It is understood that the mobile device 720 may include a plurality of executable instructions, including instructions for device management. Accordingly, various aspects of the methods of the preceding embodiments may be executed by the mobile device 720.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. Accordingly, all such modifications are intended to be included within the scope of this disclosure.

What is claimed is:

1. A method comprising:
    monitoring a mobile device for activity indicating user interest in an advertising area;
    presenting an advertisement on the mobile device, the advertisement based at least partly upon the user interest in the advertising area;
    downloading at least a portion of a file while presenting the advertisement; and
    when presenting the advertisement is completed without interruption, stopping downloading of the file.

2. The method of claim 1, wherein the downloading occurs without disrupting the advertisement.

3. The method of claim 2 further comprising:
    storing a downloaded portion of the file; and
    storing information corresponding to the downloaded portion.

4. The method of claim 3 wherein the information includes a file name of the downloaded portion, a size of the downloaded portion, and a storage location of the downloaded portion.

5. The method of claim 1 wherein presenting the advertisement on the mobile device includes:
    sending a request for the advertisement to an ad server component stored on the mobile device; and
    receiving the advertisement from the ad server component.

6. A method comprising:
    downloading at least a portion of a file while an application is being executed, wherein the downloading does not interfere with the execution of the application;
    when the file is not completely downloaded, ending the downloading when the application is finished executing without interruption; and
    storing a downloaded portion of the file on the mobile device, wherein the downloaded portion of the file comprises a portion of the file when the file was not completely downloaded and comprises the file when the file was completely downloaded.

7. The method of claim 6 further comprising marking the file as complete if the file was completely downloaded.

8. The method of claim 6 further comprising:
    marking the file as incomplete if the file was not completely downloaded; and
    storing information corresponding to the portion of the file that was downloaded if the file was not completely downloaded.

9. The method of claim 8 wherein the information includes a file name of the portion, a size of the portion, and a storage location of the portion.

10. The method of claim 8 further comprising, file as incomplete, downloading at least another portion of the file while a second application is being executed.

11. The method of claim 6 further comprising:
    determining that the application is still executing after the file has been completely downloaded; and
    downloading at least a portion of another file while the application is being executed.

12. An advertising engine for use with a mobile device comprising:
    a main engine stored on the mobile device;
    an ad server coupled to the main engine and stored on the mobile device, wherein the ad server is configured to deliver a first file to the main engine in response to a request from the main engine;
    an assistant component coupled to the main engine and stored on the mobile device, wherein the assistant component is configured to provide a plurality of configuration options to a user, store selections made by the user with respect to the configuration options, and pass the selections to the main engine; and
    a data gathering component coupled to the main engine and stored on the mobile device, wherein the data gathering component is configured to monitor user activity in which the activity is regulated according to the configuration options, and to select the first file from a plurality of files based at least partly upon the monitored user activity,
    wherein the main engine is configured to present the first file delivered from the ad server on the mobile device, to download at least a portion of a second file while presenting the first file, and when the first file is completely presented without interruption, to end downloading of the second file.

13. The advertising engine of claim 12 wherein disabling of the assistant component on the mobile device also disables the data gathering component.

14. The advertising engine of claim 12 further comprising an electronic file system configured to store a downloaded portion of the second file and to store information corresponding to the downloaded portion of the second file.

15. A mobile device comprising:
    a wireless network interface;
    a processor coupled to the wireless network interface; and
    a memory coupled to the processor and configured to store a plurality of instructions for use by the processor, including:
        instructions for presenting an advertisement on the mobile device;
        instructions for downloading at least a portion of a file while presenting the advertisement; and
        instructions for, when presenting the advertisement is completed without interruption, ending downloading of the file.

16. The advertising engine of claim 12, wherein the main engine is further configured to download at least a portion of the second file while presenting the first file without disrupting the first file.

17. The mobile device of claim 15 wherein the instructions further include:
    instructions for a main engine; and
    instructions for an ad server coupled to the main engine, wherein the ad server is configured to deliver the advertisement to the main engine in response to a request from the main engine.

18. The mobile device of claim 17 wherein the instructions further include:
    instructions for an assistant component coupled to the main engine, wherein the assistant component is configured to provide a plurality of configuration options to a user of the mobile device, store selections made by the user with respect to the configuration options, and pass the selections to the main engine; and
    instructions for a data gathering component coupled to the main engine, wherein the data gathering component is configured to monitor user activity in order to select the advertisement from a selection of advertisements.

19. The mobile device of claim 15 further comprising:

instructions for storing a downloaded portion of the file; and instructions for storing information corresponding to the downloaded portion of the file.

20. The mobile device of claim 15 further comprising:

instructions for determining whether the file has been completely downloaded when presenting the advertisement is completed; and instructions for storing the file on the mobile device, wherein only a downloaded portion of the file is stored if the file was not completely downloaded.

* * * * *